March 1, 1955  W. S. PEASE ET AL  2,703,122
APPLE CELLING AND SLICING MACHINE
Filed May 31, 1952

Inventor
WARREN S. PEASE AND
JOHN E. LINDSAY

Bean, Brooks, Buckley & Bean.
Attorneys

2,703,122

APPLE CELLING AND SLICING MACHINE

Warren S. Pease and John E. Lindsay, Rochester, N. Y., assignors to F. B. Pease Company, Inc., Rochester, N. Y.

Application May 31, 1952, Serial No. 290,891

2 Claims. (Cl. 146—40)

This invention relates to machines for seed-celling and slicing apples and similar fruits.

In preparing apples for cooking, canning, drying or deep freezing, it is customary, in commercial operation, to first pare and core the apples and then feed them into a machine where their seed-cells are removed and the apples are sliced radially into any desired number of segments. A common type of seed-celling and slicing machine comprises a spindle for receiving a succession of cored apples which move along the spindle to be successively seed-celled and sliced.

In the general type of seed-celling and slicing machine here under consideration, each apple is moved into partial engagement with the slicing knives and is held against rotation by such knives while a seed-celling knife carried by the spindle cuts out the seed-cells by rotation of the spindle. The apple is then pushed further along the spindle to be fully sliced by the slicing blades.

Machines of this general type have heretofore been found to be the most satisfactory thus far available, but the percentage of fruit which bursts during the seed-celling operation or at least prior to complete slicing has been an important and expensive failing. The most trouble along this line is encountered when the fruit is unusually soft and fully ripe.

Furthermore, in some machines of this type the relationship of the seed-celling knife and the slicing blades is fixed and accordingly the apples, when they are in position to be seed-celled, are partially sliced to a greater or lesser degree depending on their individual sizes. This further aggravates the problem of retaining apples in sound and integral condition until they are sliced.

The present invention provides a slicing arrangement wherein the slicing knives are utilized to retain the fruit against rotation during seed-celling but one wherein the presence of the slicing knives actually assists in the prevention of splitting or bursting of the fruit during seed-celling, rather than adding to the danger of splitting or bursting as has been the past tendency of the partial slicing of the fruit prior to seed-celling.

In the arrangement of the present invention, the knives are so shaped and proportional that they form an encompassing or surrounding and containing means which greatly assists in retaining the integrity of the fruit during the rotation of the seed-celling knife in the interior of the fruit, the latter exerting an inevitable spreading or bursting force on the cored fruit.

Other advantages of the seed-celling and slicing arrangement which forms the subject matter of the present invention will appear to those skilled in this art from a consideration of the exemplary embodiment illustrated in the accompanying drawing and described in detail in the following specification. However, it is to be understood that the form thus set forth by way of example is subject to considerable mechanical variation and modification without departing from the underlying principles of the present invention. The spirit and scope of the invention is not restricted otherwise than as defined in the appended claims.

Figure 1:
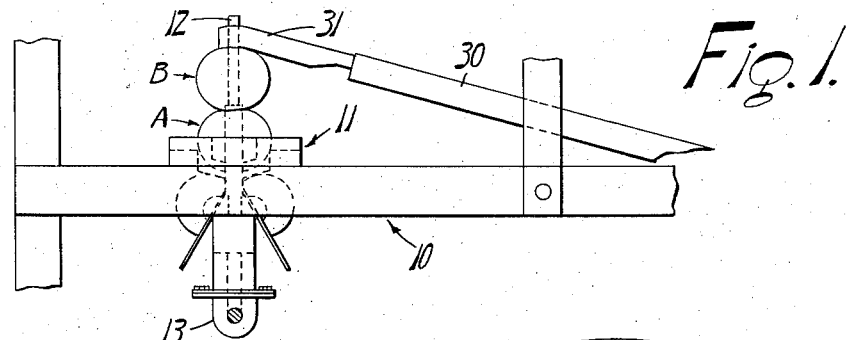
Fig. 1 is a somewhat schematic fragmentary general elevational view of a seed-celling and slicing machine constructed in accordance with one embodiment of the present invention.

In the drawing like characters of reference denote like parts and, referring particularly to Fig. 1, the numeral 10 designates generally the framework of a seed-celling and slicing machine which is shown only fragmentarily in Fig. 1. A slicing ring or spider, designated generally 11 in Fig. 1, is supported by framework 10 and a vertical fruit receiving spindle 12 extends concentrically through the slicing ring 11 and is supported at its lower end for driving rotation by a transmission housing 13 which is fixed to the framework 10. The details of construction of the framework and the spindle mounting, excepting as they will be later described in detail herein, is conventional and well-known.

The spindle 12, as has been stated, is supported at its lower end by rotating drive means in transmission housing 13 so that its vertical position is fixed independently of the stationary slicing ring 11. Spindle 12 is flattened as at 14 and a bowed seed-celling knife 15 is fixed thereto as by means of screws 16. The slicing ring or spider 11 comprises an outer ring 17 and a coaxial inner ring or ferrule 18. The rings 17 and 18 are preferably each provided with a circumferential series of radial grooves or kerfs, 19 and 20, respectively, in their upper ends, for receiving the inner and outer ends of a radial series of slicing knives designated generally 22.

Figure 2:
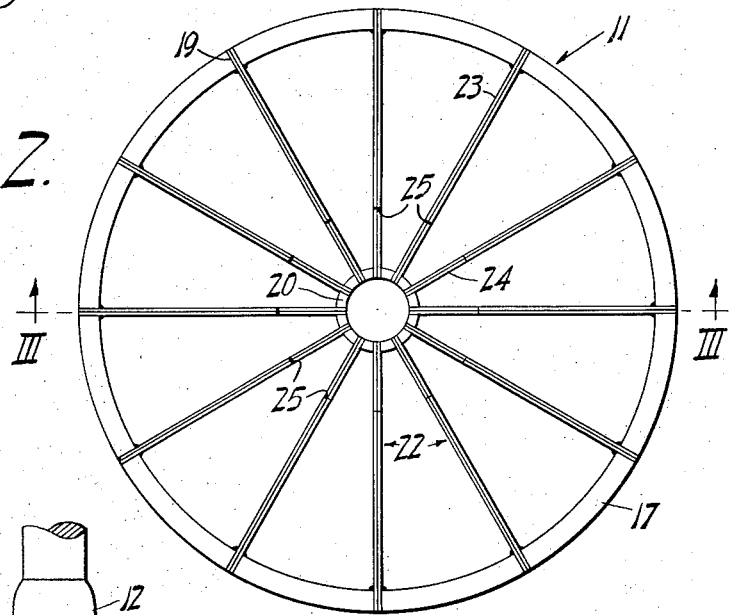
Fig. 2 is a top plan view of the slicing knife unit of Fig. 1.

Each slicing knife or blade has an outer generally horizontal slicing edge 23 and an inner generally horizontal slicing edge 24 at a substantially lower level. The thus stepped outer and inner slicing edges are connected by a generally vertical edge portion which is not a slicing edge but a relatively blunt edge which in the instance shown by way of example herein is substantially a square edge as at 25 in Fig. 2.

Figure 3:
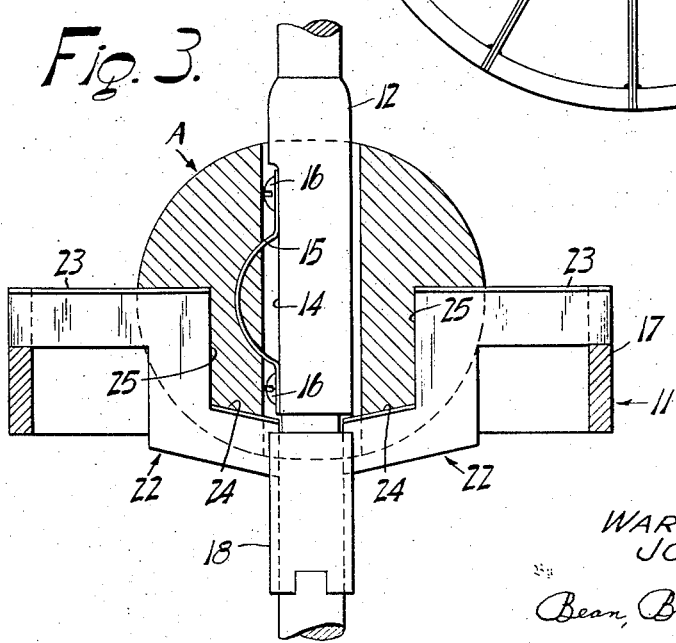
Fig. 3 is a central vertical cross sectional view of the seed-celling knife and slicing knife portion of the apparatus viewed as in Fig. 1 but on a larger scale.

While the flat plates which make up the slicing knives 22 are relatively thin individually, the multiplicity of square generally vertical edges 25 which face the spindle axis and surround the central portion of an apple or other fruit when it is in the seed-celling position shown in Fig. 3 cooperate to perform a very efficient and important confining function which imposes a material restraint against splitting or bursting of the fruit. This function is, of course, of especial importance in view of the tendency of the rotating seed-celling knife to spread the fruit outwardly.

It will be noted that, with the degree to which cutting has progressed in Fig. 3, because of the stepped knife arrangement, there is a substantial amount of the body of the apple which lies below the seed-celling point which is uncut at the time of celling. Note the uncut apple portion which is roughly bounded by knife edge 24 blunt edge 25 and the lower arc of the celling knife.

The major part of the apple which is sliced at the time of celling, bounded roughly by blunt edge 25, knife edge 23, and the outline of the apple, lies out toward the greatest diameter of the fruit where its lever arm to resist the turning tendency of the fruit is greatest.

As stated previously, the outer and inner ends of the knives or blades 22 are fitted into grooves or kerfs 19 and 20, respectively, in the outer and inner rings 17 and 18. These blades may be retained in such assembled position in any desired manner, as merely by being press-fitted, or assembly may be made permanent or rigid by brazing or otherwise. It is not essential to the present invention that the rings be grooved to receive the knife ends, and the latter may merely abut the rings and be brazed or welded thereto.

It will be noted in Fig. 3 that the inner ends of the slicing edges 24 extend inwardly beyond and underlie the enlarged portion of spindle 12 and thus extend inwardly beyond the seed-celling knife 15, and also inwardly beyond the outer diameter of ferrule 18 and above the same. This prevents pieces of carpel tissue dislodged by the seed-celling operation from becoming jammed at the central part of the slicing spider, a condition which has previously frequently been encountered.

It will further be noted that these lower or inner slicing edges 24 are inclined downwardly toward the center of the spider. As the apple is forced downwardly past the knives pieces of carpel tissue tend to lay over the cutting edges 24 and thus impede the slicing action. The inclination of the edges 24 forces this extraneous tissue toward the center of the spider where it is carried downwardly with the material removed from the apple in seed-celling.

The exact vertical extent of the square edges 25 and the diameter of the circle along which they lie when viewed in plan may vary, and the optimum dimensions in this respect will depend upon the range of fruit sizes which are to be dealt with in a given situation. The cored apple indicated at A in Fig. 3 is by way of schematic illustration only, and does not necessarily depict an ideal relationship of the knife edges relative to a given fruit size and seed-celling knife size.

Also, the knife edges 23 and 24 are referred to as generally horizontal, but these edges may vary considerably from the horizontal for various reasons, while maintaining their desired stepped relation and the containing function of the generally vertical square edges 25.

The general details of construction and operation of the machine apart from the specific details described above is well-known and conventional. Referring to Fig. 1, a swinging arm 30 has a forked end 31 which swings downwardly between successive seed-celling operations to push apple A through the slicing ring through the intervention of an overlying apple B, this operation completing the slicing of apple A and disposing apple B in position for seed-celling.

What is claimed is:

1. In a seed-celling and slicing machine, a rotary spindle, a seed-celling knife carried by said spindle, means for rotating said spindle, a slicing spider concentric with said spindle and comprising a plurality of radial slicing blades, means for moving cored fruit along said spindle toward and past said seed-celling knife, said radial slicing blades being directed against the oncoming fruit, said blades each having stepped slicing edge portions and a connecting relatively blunt edge portion, the latter extending generally parallel to the spindle axis facing the same and axially overlapping a major portion of the extent of the seed-celling knife, whereby a piece of fruit on said spindle in position to be acted upon by the seed-celling knife is partly sliced by said blades and contained against bursting by said blunt edge portions being embedded in the fruit about the seed celling zone.

2. In a seed-celling and slicing machine, a rotary spindle, a seed-celling knife carried by said spindle, means for rotating said spindle, a slicing spider concentric with said spindle and comprising inner and outer supporting rings and a plurality of radial slicing blades extending therebetween, means for moving cored fruit along said spindle toward and past said seed-celling knife, said radial slicing blades being directed against the oncoming fruit, said blades each having stepped slicing edge portions and a connecting relatively blunt edge portion, the latter extending generally parallel to the spindle axis facing the same and axially overlapping a major portion of the extent of the seed-celling knife, whereby a piece of fruit on said spindle in position to be acted upon by the seed-celling knife is partly sliced by said blades and contained against bursting by said blunt edge portions being embedded in the fruit about the seed celling zone.

References Cited in the file of this patent

UNITED STATES PATENTS

| | | |
|---|---|---|
| 2,496,637 | Pease | Feb. 7, 1950 |
| 2,509,781 | Pease | May 30, 1950 |
| 2,513,341 | Marasco | July 4, 1950 |